US012417276B2

(12) United States Patent
Ghergu et al.

(10) Patent No.: US 12,417,276 B2
(45) Date of Patent: Sep. 16, 2025

(54) ROBOTIC PROCESS AUTOMATION BASED PASSWORD MANAGEMENT

(71) Applicant: International Business Machines Corporation, Armonk, NY (US)

(72) Inventors: Laurentiu Gabriel Ghergu, Bucharest (RO); Florentina Cristina Moise, Bucharest (RO); Ciprian Constantinescu, Bucharest (RO); Diana Acsinia, Bucharest (RO)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 18/470,615

(22) Filed: Sep. 20, 2023

(65) Prior Publication Data

US 2025/0094560 A1 Mar. 20, 2025

(51) Int. Cl.
*G06F 21/46* (2013.01)
(52) U.S. Cl.
CPC .................... *G06F 21/46* (2013.01)
(58) Field of Classification Search
CPC ........... G06F 21/46; G06F 21/31; G06F 21/45
See application file for complete search history.

(56) References Cited

U.S. PATENT DOCUMENTS

| 7,441,264 | B2 | 10/2008 | Himmel |
| 9,501,636 | B1 * | 11/2016 | Elshishiny ............... H04L 63/20 |
| 10,331,879 | B1 * | 6/2019 | Jiang ..................... H04L 63/083 |
| 10,733,329 | B1 * | 8/2020 | Ragupathy ............. G06F 21/78 |
| 11,080,180 | B2 | 8/2021 | Baughman |
| 2008/0196101 | A1 * | 8/2008 | Sade ........................ G06F 21/33 726/22 |
| 2018/0176195 | A1 * | 6/2018 | Pangam ................. G06F 21/45 |
| 2018/0276398 | A1 * | 9/2018 | Linton ................. G06F 21/121 |
| 2021/0006402 | A1 * | 1/2021 | Ohms ................... H04L 9/0643 |

(Continued)

FOREIGN PATENT DOCUMENTS

CN 114448648 B 8/2022

OTHER PUBLICATIONS

Credentials management within CI/CD environment; 2018; retrieved from https://serverfault.com/questions/924431/credentials-management-within-ci-cd-environment (Year: 2018).*

(Continued)

*Primary Examiner* — James R Turchen
(74) *Attorney, Agent, or Firm* — Joseph P. Curcuru (57) ABSTRACT

In an approach to improve password management through the utilization of robotic process automation robot, embodiments run, through a continuous integration server, a deployment process. Further, responsive to encountering an access-controlled resource that requires a password, embodiments execute a password manager component, and utilize the password manager component to determine if the password is stored in an encrypted format on a database. Additionally, responsive to determining the password is stored in the encrypted format on the database, embodiments decrypt the password based on a master key, and responsive to decrypting the password, embodiments integrate the password into a configuration file located in source code of an application, so the password is not accessible outside the password manager component.

20 Claims, 4 Drawing Sheets

(56) References Cited

U.S. PATENT DOCUMENTS

| | | | | |
|---|---|---|---|---|
| 2021/0042738 | A1* | 2/2021 | Edwards | G06Q 20/38 |
| 2021/0073373 | A1* | 3/2021 | Siegrist | H04L 63/083 |
| 2022/0108022 | A1* | 4/2022 | Bishop, III | G06F 8/75 |
| 2022/0335110 | A1* | 10/2022 | Isaacs | G06F 21/31 |
| 2023/0041959 | A1* | 2/2023 | Guccione | H04L 9/0822 |
| 2023/0088524 | A1* | 3/2023 | Greer | G06F 21/577 |
| | | | | 726/25 |
| 2023/0153136 | A1* | 5/2023 | Dennis | G06F 21/31 |
| | | | | 717/115 |
| 2024/0007455 | A1* | 1/2024 | Sarkar | H04L 63/083 |
| 2024/0396887 | A1* | 11/2024 | Segaert | H04L 63/083 |

OTHER PUBLICATIONS

Jean-Christophe Vassort; Gitlab CI/CDandpassbolt secrets automation; Feb. 7, 2022; retrieved from https://www.passbolt.com/blog/gitlab-ci-cd-and-passbolt-secrets-automation (Year: 2022).*

How do I secure sensitive information like system credentials in a configuration file?; Nov. 2022; retrieved from https://security.stackexchange.com/questions/265499/how-do-i-secure-sensitive-information-like-system-credentials-in-a-configuration (Year: 2022).*

"AWS Secrets Manager: User Guide," AWS, 2023, 214 pages. https://docs.aws.amazon.com/secretsmanager/latest/userguide/rotate-secrets_turn-on-for-other.html.

Battina, D., "The Challenges And Mitigation Strategies Of Using Devops During Software Development," International Journal of Creative Research Thoughts (IJCRT), vol. 9, Issue 1, Jan. 2021, pp. 4760-4765.

Mysari, S., "Continuous Integration And Continuous Deployment Pipeline Automation Using Jenkins Ansible," Conference Paper, 2020 International Conference on Emerging Trends in Information Technology and Engineering, Feb. 2020, pp. 1-4. https://www.researchgate.net/publication/340975889.

Ramanujam et al., "Prevention Of Data Stealing Using Password Managers," International Research Journal of Modernization in Engineering Technology and Science, vol. 02, Issue: 06, Jun. 2020, pp. 486-492.

Mlla, J., "How To Automate Password Generation For IT?" LinkedIn, Dec. 26, 2022, 5 pages. https://www.linkedin.com/pulse/how-automate-password-generation-javier-villa.

* cited by examiner

ROBOTIC PROCESS AUTOMATION BASED PASSWORD MANAGEMENT

BACKGROUND OF THE INVENTION

The present invention relates generally to password management, and more particularly to the field of password management through robotic process automation.

Robotic process automation (RPA), also known as software robotics, uses automation technologies to mimic back-office tasks of human workers, such as extracting data, filling in forms, moving files, etc. It combines APIs and user interface (UI) interactions to integrate and perform repetitive tasks between enterprise and productivity applications. By deploying scripts which emulate human processes, RPA tools complete autonomous execution of various activities and transactions across unrelated software systems. This form of automation uses rule-based software to perform business process activities at a high-volume, freeing up human resources to prioritize more complex tasks.

SUMMARY

Embodiments of the present invention disclose a computer-implemented method, computer system, and computer program product for improving password management, the computer-implemented method comprising: running, through a continuous integration server, a deployment process; responsive to encountering an access-controlled resource that requires a password, executing a password manager component; utilizing the password manager component to determine if the password is stored in an encrypted format on a database; responsive to determining the password is stored in the encrypted format on the database, decrypting the password based on a master key, wherein the master key is managed through a generation algorithm; and responsive to decrypting the password, integrating the password into a configuration file located in source code of an application, wherein the password is not accessible outside the password manager component.

DETAILED DESCRIPTION

Embodiments of the present invention recognize that in the software development industry, when a new software needs to be installed in production it will need access to various confidential information/data (e.g., username and passwords for service accounts, application programming interface (API) keys for calling external production web services, etc.). Embodiments of the present invention recognize that currently in the industry confidential data and credentials are managed by a development and operations (DevOps) specialist or other specialists responsible for the production deployment process. Further, embodiments of the present invention recognize that some of the confidential data and credentials can be stored in secure solutions like a password manager; however, the master key for accessing the secrets vault is known by a human actor. Embodiments of the present invention recognize that there is a security risk of having a human actor managing confidential data (e.g., passwords) especially as the employees who manage the deployment process of sensitive production systems leave a company with the knowledge of confidential data (e.g., passwords).

Additionally, embodiments of the present invention recognize that it would challenging to identify a "bad actor" (e.g., hacker) if the "bad actor" is a former employee because they will have the option to delete their tracks given that they know the production passwords (or master passwords) for the systems they supervise. Further, embodiments of the present invention recognize that, currently, the software development industry does not have a solution for protecting the master password of a system (e.g., the password (or encryption key) for the vault that contains all other secrets that the system is using in an encrypted format). Embodiments of the present invention recognize that, currently in the industry, there are no known solutions to the presented problem. A secret is any sensitive data (e.g., passwords, tokens, API Keys or certificates, and/or any other sensitive data known and understood in the art. Embodiments of the present invention recognize that the DevOps specialist or infrastructure specialist will manually place the password in configuration files that are used during the deployment process. For example, a Terraform script that manages the code installation on the remote server. However, the above does not solve the problem as a human actor is aware of unencrypted password.

Embodiments improve the art and solve, at least the issues above, by managing a password in a DevOps pipeline for an application. More specifically, embodiments improve the art and solve, at least the issues above, by managing a password in a DevOps pipeline for an application by (i) running a deployment process via a continuous integration server, (ii) executing a password manager component, wherein executing a password manager component comprises: checking if the required password is stored in encrypted format in a database, wherein if the password is present in the database, decrypts the password based on a master key that is managed by the invention using the same generation algorithm or if the password is not present in the database, executes a workflow to generate a new password by navigating the access-controlled resource, and responsive to the password manager component comprises the decrypted password, inserting the decrypted password in a configuration file located in the application's source code on the build server by the continuous integration server, wherein the password is not accessible from outside the password manager component.

Implementation of embodiments of the invention may take a variety of forms, and exemplary implementation details are discussed subsequently with reference to the Figures (i.e., FIG. 1-FIG. 4).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 1:
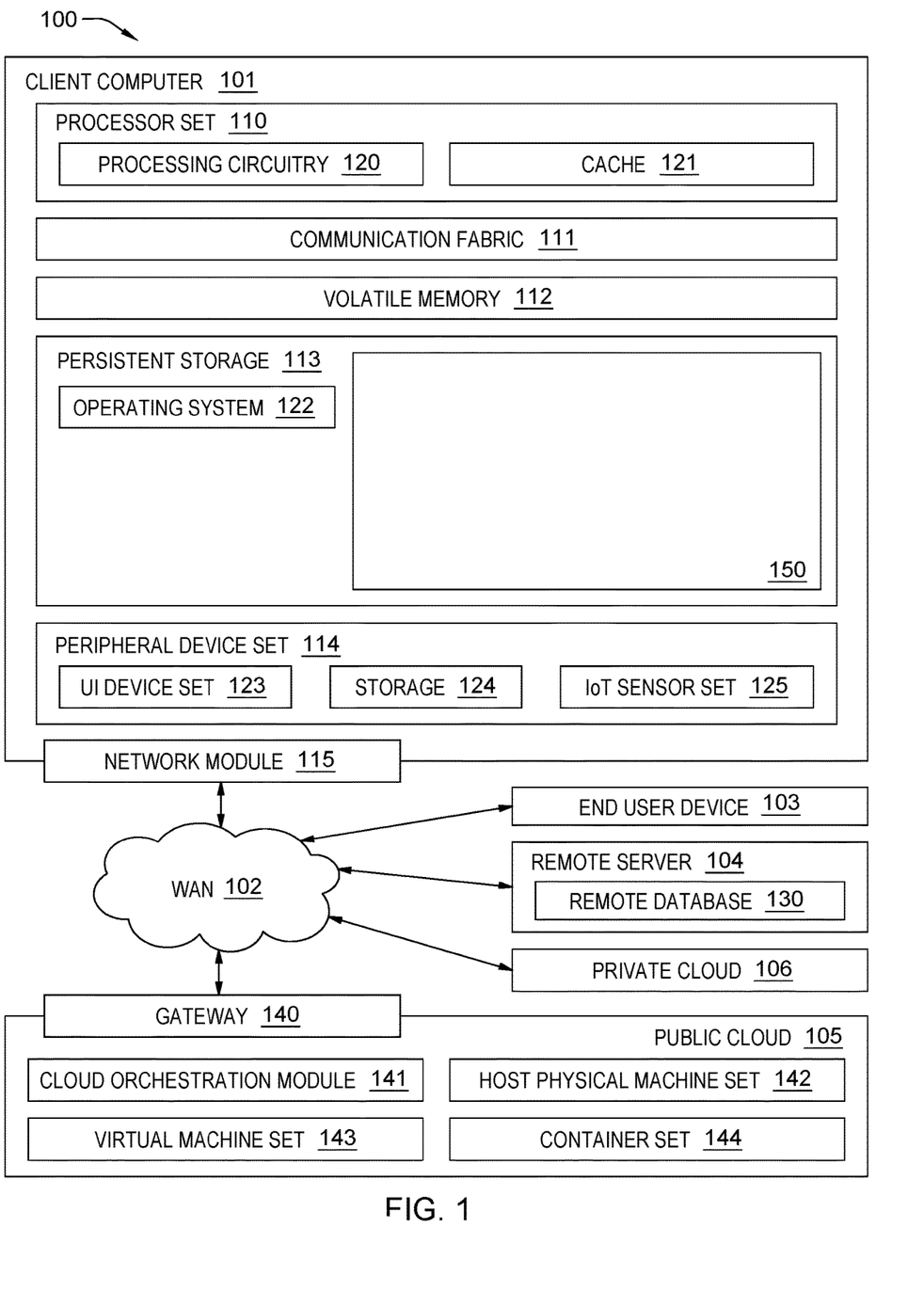
FIG. 1 is a functional block diagram illustrating a distributed data processing environment, a program, in accordance with an embodiment of the present invention.

Computing environment 100 contains an example of an environment for the execution of at least some of the computer code involved in performing the inventive methods, such as program (component) 150. In addition to component 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and component 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, a virtual reality headset, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in component 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in component 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, central processing unit (CPU) power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Component 150 improves the art and solves, at least the issues above, by managing a password in a DevOps pipeline for an application. More specifically, component 150 improves the art and solves, at least the issues above, by managing a password in a DevOps pipeline for an application by (i) running a deployment process via a continuous integration server, (ii) executing a password manager component, wherein executing a password manager component comprises: checking if the required password is stored in encrypted format in a database. In various embodiments, if the password is present in the database the component 150 decrypts the password based on a master key that is managed by the component 150 using the same generation algorithm. However, if the password is not present in the database, then component 150 executes a workflow to generate a new password by navigating the access-controlled resource. In various embodiments, responsive to the password manager component comprises the decrypted password, component 150 inserts the decrypted password in a configuration file located in the application's source code on the build server by the continuous integration server, wherein the password is not accessible from outside the password manager component. Component 150 may generate and install secrets in DevOps pipelines for applications. Component 150 may lock access or prohibit the access to the password based on predefined and/or predetermined parameters. Component 15 may be or operates a robotic process automation (RPA) robot. In various embodiments, the RPA robot is labeled as "keeper" that will manage both the password generation as well as the installation of the password in the environment where it will be used. An example of the overall architecture is presented in FIG. 2 below.

Figure 2:
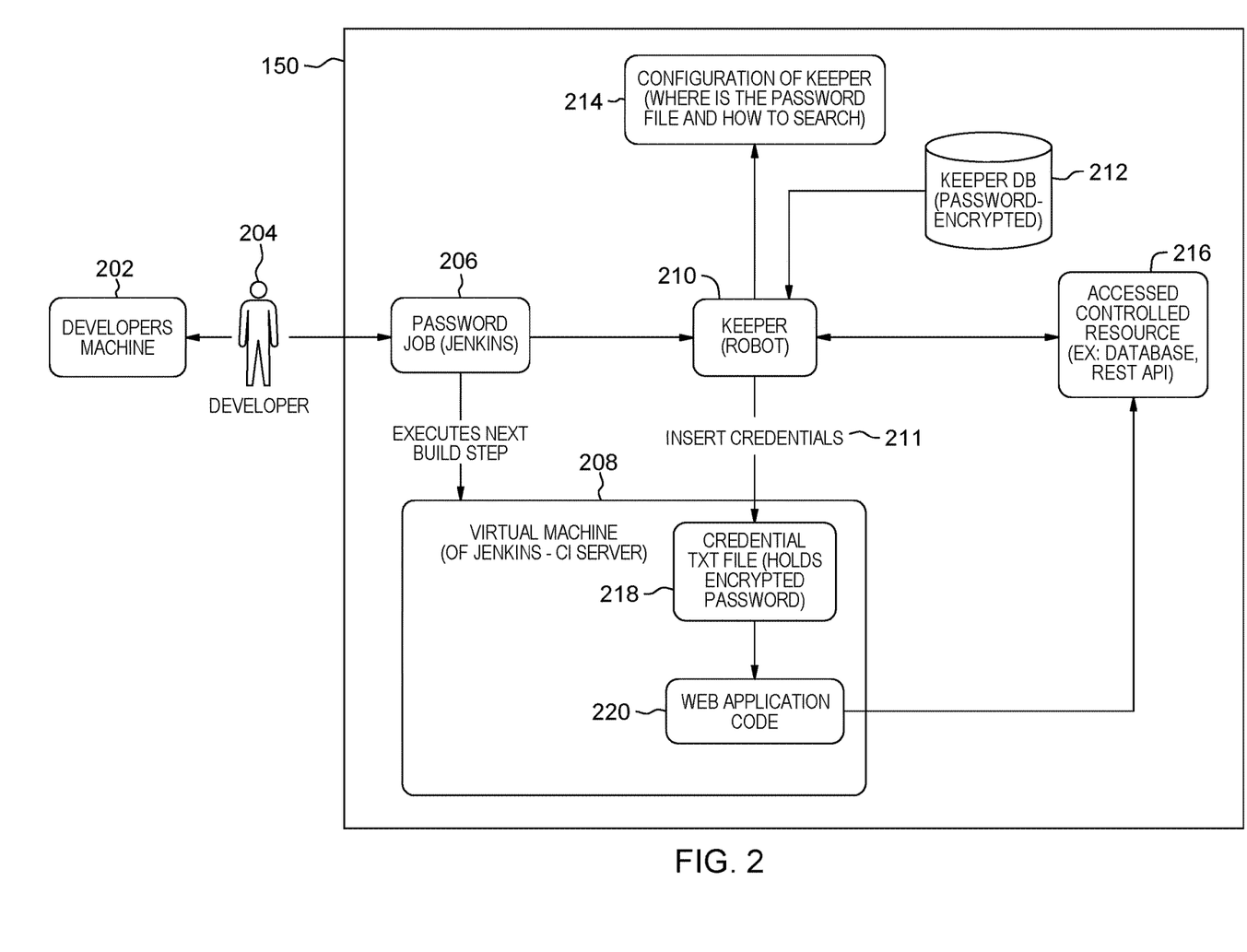
FIG. 2 illustrates a functional block diagram and operational steps of the program, on a server computer within the distributed data processing environment of FIGS. 1, in accordance with an embodiment of the present invention.

FIG. 2 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes predetermined area 159, client computer 101, and remote server 104 interconnected via WAN 102.

FIG. 2 is one embodiment of the architecture of component 150, in accordance with one embodiment of the invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

In the depicted embodiment, component 150 receives a command or alert from developer's machine 202 that developer 204 has initiated a deployment process of a password job through a standard continuous integration server. Developer's machine 202 is a computing device as it is known and understood. In various embodiments, responsive to receiving a command or alert that the deployment process of a password job has been received, component 150 executes keeper (robot) 210. In the depicted embodiment, during the deployment pipeline, robot 210 is executed. In various embodiments, component 150, via robot 210, determines whether the password is stored in encrypted format in database 212. In the depicted embodiment, if the password is present in database 212 for the resources required by the code as per robot configuration file 214 then robot 210 will utilize an asymmetric encryption algorithm to decrypt the password based on a master key that is managed by component 150 using the same generation algorithm. In various embodiments the deployment process represents a password job request.

Robot configuration file 214 enables component 150 to understand the type and kind of passwords required by the code which is being built. For example, a developer may need a password to be placed in the code that is for accessing a production SAP system. Another developer may need a password to be placed in the code for accessing the production REST API of a mobile application. In various embodiments, information associated with the requirements for code identification and accessibility is store in robot configuration file 214 that robot 210 (e.g., keeper) reads. Robot 210 may dynamically analyze the source code of the application being built to determine what kind of passwords component 150 needs and identifies a location in the code to place the required information (which files in GIT). For example,     As a YAML file
    version: "3"
      sources:
        name: MobileAppPass
        pathToPutRealPasswordValue: ./resources/config-files/passwordsFile.txt In various embodiments, component 150 stores the passwords it finds (generated via RPA workflows a.k.a. generation algorithm) in a private database (e.g., database 212). Component 150 may store the passwords in an encrypted format. In various embodiments, a master key (master password) to decrypts the passwords.

In various embodiments the generation algorithm is utilized to generate passwords for each required password in the configuration file and to generate a master password. The generation algorithm enables and facilitates the create of re-usable custom workflows that can be used to generate passwords in known systems. For example, an RPA code is written that will automatically generate passwords for SAP utilizing a web service call. In another example, an RPA workflow generates an account for a specific program or computing device application and utilizes the associated password by placing the generated password from the specific program or computing device application in the code associated with the specific program or computing device application.

In the depicted embodiment, if component 150 determines that the password is not present in database 212, then robot 210 loads and executes a workflow to generate a new password by navigating access-controlled resource 216 (e.g., representational state transfer (REST) application programming interface (API)).

In various embodiments, a workflow is a reusable component, wherein there is a finite set of workflows that prove that component 150 can operate. Component 150 utilizes the data in the configuration file to detect which workflow to execute for a specific password. That workflow will use an RPA bot to generate a new password in the target system and a keeper will further utilize the password.

In various embodiments, component 150, via robot 210 creates a user profile and password by navigating a database user interface. In various embodiments the workflow is predetermined. In other embodiments, the workflow is retrieved from a shared database not depicted in FIG. 2.

In the depicted embodiment, robot 210 inserts credentials 211 (e.g., decrypted password) into configuration credential file (credential file) 218 located in web application code 220 (e.g., the project's source code) on virtual machine 208. For example, component 150, via robot 210, downloads the project's source code on the build server utilizing virtual machine 208 (e.g., the continuous integration solution), wherein once robot 210 obtains or generates the decrypted password, robot 210 inserts the decrypted password into a configuration file located in the project's source code. In the depicted embodiment, component 150 utilizes web application code 220 and credential file 218 to call REST API. In various embodiments, robot 210 comprises a plugin-based architecture that enables the use of specific workflows for specific systems. The plugin-based architecture is described further in FIG. 3.

For example, there is a REST API for creating a cash account in a bank. In this example, some changes to the deliverables are made and regression testing using Jenkins is being performed. Further, in this example, a developer pushes the code to GIT, which triggers the running of the Jenkins job. The Jenkins job then creates a virtual machine that deploys the application and requests to securely connect the application to a database that is on a different machine. In this example, a mechanism to authenticate is needed to enable the secured connection between the application and the database. Further, in this example, the Jenkins job inserts the 'secrets'/credentials, but instead of storing these credentials in a traditional vault, a generated "bot" (the Keeper) generates credentials for this dedicated job while a configuration file for the Keeper is created. In various embodiments, the Keeper may request a new password to be generated and insert the generated new password into a specific configuration file located on the production server.

Continuing this example, the application reads the password value from the file, wherein the Keeper will read the request to generate workflow from the specified configuration file and reads the identification code or number of the RPA workflow to execute the code. In this example, the workflow navigates the user interface of the bank's website and creates a new service account to be used by the application, wherein the service account will be stored in the keeper database. In this example, the service account will be injected with the password file specified in the configuration file which keeps the generated data secret and unknown to anyone or thing except the program and/or system. In this example, the credentials generated and used above are stored in the Keeper database. Further, in this example, the Jenkins job reuses the credentials to authenticate and execute actions for the duration of the run. Additionally, responsive to the job ending the Keeper shuts down and the Keeper database is removed (e.g., deleted). In various embodiments, responsive to a job failing the generated credentials are removed, via the Keeper or user.

Figure 3:
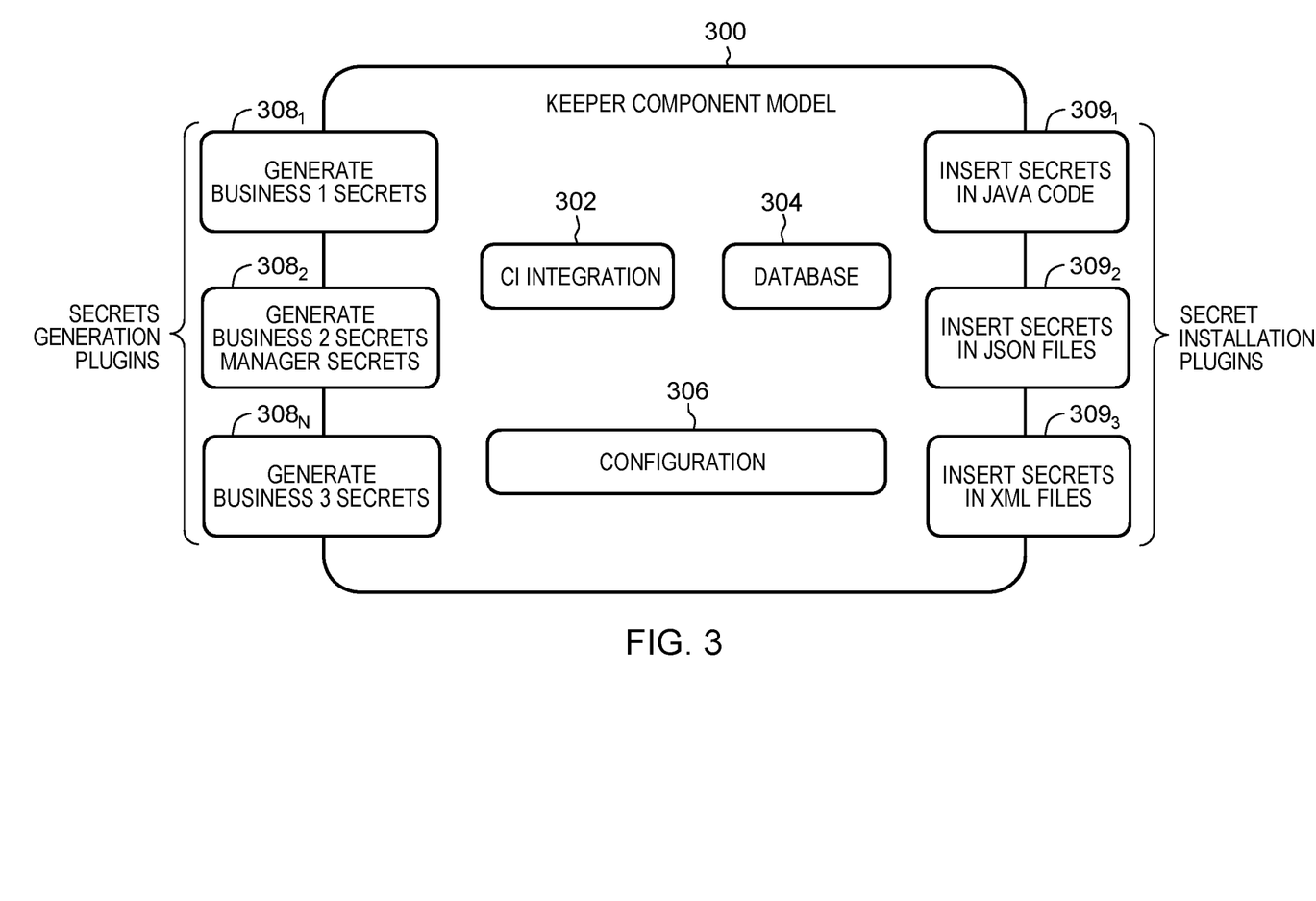
FIG. 3 illustrates a functional block diagram and operational steps of the program, on a server computer within the distributed data processing environment of FIGS. 1, in accordance with an embodiment of the present invention.

FIG. 3 is example of plugin-based architecture of robot 210 represented by robot component model 300, in accordance with one embodiment of the invention. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims. In various embodiments, plugins are workflows, wherein the plugins (i.e., workflows) are utilized for generating passwords required by the application code.

In the depicted embodiment, robot component model 300 comprises continuous integration (CI) server 302, database 304, configuration 306, secrets generation plugins $308_1$-$308_N$, and secret installation plugins $309_1$-$309_N$. As used herein, N represents a positive integer, and accordingly the number of scenarios implemented in a given embodiment of the present invention is not limited to those depicted in FIG. 3. In various embodiments, robot 210 comprises a plugin-based architecture that enables the use of specific workflows for specific systems. In the depicted embodiment, a set of plugins are those which generated passwords in various access-controlled resources (e.g., secrets generation plugins $308_1$-$308_N$) by navigating the administrative interface using a technical account or on behalf of the DevOps specialist utilizing open authorization (OAuth2) based authentication. OAuth 2.0 is a protocol that enables access to resources of a user without sharing passwords. In the depicted embodiment, another set of plugins is utilized to insert the secret values into code assets (e.g., secrets generation plugins $308_1$-$308_N$). For example, the robot can insert the secrets in known locations based on the project type (.Net, Java, etc.) or by using specific technology related procedure.

Figure 4:
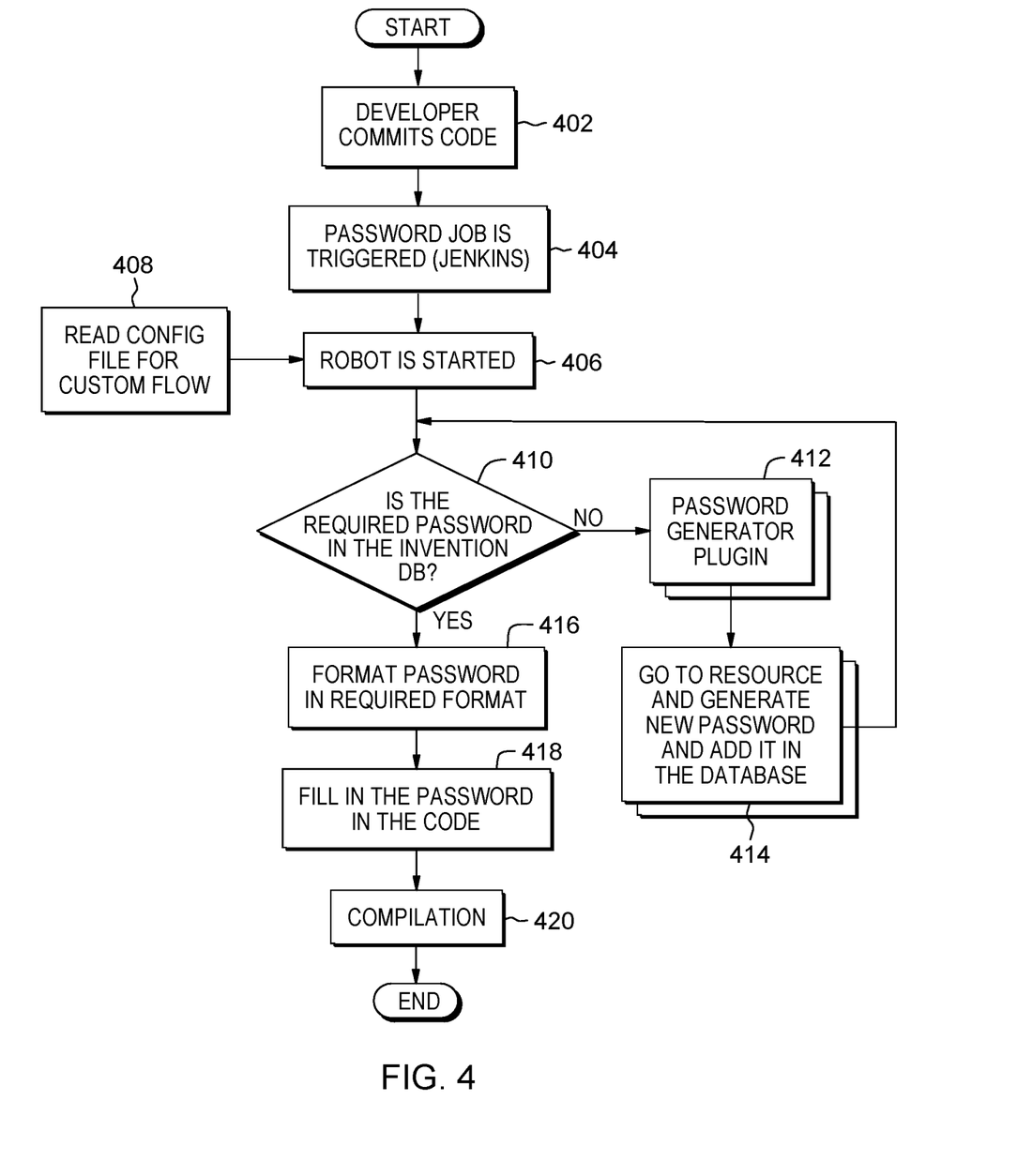
FIG. 4 illustrates operational steps of the program, on a server computer within the distributed data processing environment of FIGS. 1, for managing a password in a DevOps pipeline for an application, in accordance with an embodiment of the present invention.

FIG. 4 illustrates operational steps of component 150, generally designated 200, in communication with client computer 101, remote server 104, private cloud 106, EUD 103, and/or public cloud 105, within distributed data processing environment 100, for managing a password in a DevOps pipeline for an application, in accordance with an embodiment of the present invention. FIG. 5 provides an illustration of one implementation and does not imply any limitations with regard to the environments in which different embodiments may be implemented. Many modifications to the depicted environment may be made by those skilled in the art without departing from the scope of the invention as recited by the claims.

In block 402, component 150 receives a code commitment (commit). In various embodiments, component 150 receives a code commit from a developer.

In block 404, component 150 is triggered by the code commit. In various embodiments, component 150 may be triggered by a commit of a user (e.g., developer) on a deployment branch.

In block 406, component 150 activates or awakens a robot. In various embodiments, responsive to bring triggered by a commit, component 150 activates or awakens the robot.

In block 408, component 150 reads a configuration file for a custom workflow. In various embodiments, component 150, via the robot, reads the configuration file for a custom workflow, wherein the custom workflow is predetermined or retrieved from a database. Component 150 may read, implement, and utilize the configuration file and custom workflow to execute the received password job. In various embodiments, component 150, via the robot, determines if the password is stored in an encrypted format in an associated database. An associated database may be any database associated with the robot and/or component 150 (e.g., a shared database, a central database, and/or a dedicated database).

In block 410, component 150 determines if the password is stored in a database. In various embodiments, component 150, via the robot, searches an associated database to determine if a password required to access an application and/or conduct the received password job is stored on the associated database. In the depicted embodiment, if component 150 determines that the databases comprises the password (Yes block) then component 150 advances to block 416. In various embodiments, responsive to the password being present in the database, component 150, via the robot decrypts the password based on a master key that is managed by component 150 using the same password generation algorithm. However, in the depicted embodiment, if component 150 determines that the password is not stored on the database (No block) then component 150 advances to block 412.

In block 412, component 150 executes a password generator plugin. In various embodiments, responsive to determining the password required to execute the password job is not present in the database, component 150 executes one or more password generating plugins. In various embodiments, component 150 comprises a plugin-based architecture that enables the use of specific workflows for specific systems. Component 150 may utilize the plugins to execute a workflow for generating a new password.

In block 414, component 150 generates a new password. In various embodiments, component 150, via the robot, generates a new password by navigating the access-controlled resource and utilizing the one or more plugins (e.g., password generating plugins and secret installation plugins). In various embodiments, component 150 stores the generated password in the database and utilizes the generated password to fulfill the password job.

In block 416, component 150 formats the password. In various embodiments, component 150 utilizes one or more plugins (e.g., secret installation plugins) to format the generated password or retrieved and decrypted password into the required format for processing and/or executing the password job request. The "Format password in required format" is focused on using the correct "secret installation plugin" for formatting the password. For example, if the <password> needs to be included directly in Java code as value of a variable, this step will generate the string: String var="<password>."

In block 418, component 150 inserts the password into the code. In various embodiments, component 150, via robot 210, enters the formatted password into a configuration file located in an application's source code after it is downloaded on the build server by the continuous integration server, wherein said password is not accessible from outside said password manager component.

In block 420, component 150 executes a compilation. In various embodiment, component 150, via a robot, executes a compilation and completes the password job request. In various embodiments, component 150, via the robot, execute the application code.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
running, through a continuous integration server, a deployment process;
responsive to encountering an access-controlled resource that requires a password, executing a password manager component;
utilizing the password manager component to determine if the password is stored in an encrypted format on a database;
responsive to determining the password is stored in the encrypted format on the database, decrypting the password based on a master key, wherein the master key is managed through a generation algorithm; and
responsive to decrypting the password, integrating the password into a configuration file located in source code of an application, wherein the password is not accessible outside the password manager component.

2. The computer-implemented method of claim 1, further comprising:
downloading, by the continuous integration server, the configuration file on a build server.

3. The computer-implemented method of claim 1, further comprising:
receiving a password job; and
activating a robotic process automation robot.

4. The computer-implemented method of claim 3, further comprising:
responsive to determining that the password is not present in the database, executing a workflow to generate a new password by navigating said access-controlled resource.

5. The computer-implemented method of claim 4, wherein generating the new password comprises:
loading and executing, by the robotic process automation robot, the workflow to generate the new password by representational state transfer (REST) application programming interface; and
creating, by the robotic process automation robot, a user profile and the password by navigating a database user interface.

6. The computer-implemented method of claim 4, further comprising:
executing, by the robotic process automation robot, a password generator plugin.

7. The computer-implemented method of claim 4, further comprising:
utilizing one or more plugins to format the generated password or retrieved and decrypted password into a required format for executing the deployment process.

8. A computer system comprising:
one or more computer processors;
one or more computer readable storage devices;
program instructions stored on the one or more computer readable storage devices for execution by at least one of the one or more computer processors, the stored program instructions comprising:
program instructions to run, through a continuous integration server, a deployment process;
responsive to encountering an access-controlled resource that requires a password, executing a password manager component;
program instructions to utilize the password manager component to determine if the password is stored in an encrypted format on a database;
responsive to determining the password is stored in the encrypted format on the database, program instructions to decrypt the password based on a master key, wherein the master key is managed through a generation algorithm; and responsive to decrypting the password, program instructions to integrate the password into a configuration file located in source code of an application, wherein the password is not accessible outside the password manager component.

9. The computer system of claim 8, further comprising:
program instructions to download, by the continuous integration server, the configuration file on a build server.

10. The computer system of claim 8, further comprising:
program instructions to receive a password job; and
program instructions to activate a robotic process automation robot.

11. The computer system of claim 10, further comprising:
responsive to determining that the password is not present in the database, program instructions to execute a workflow to generate a new password by navigating said access-controlled resource.

12. The computer system of claim 11, wherein generating the new password comprises:
program instructions to load and execute, by the robotic process automation robot, the workflow to generate the new password by representational state transfer (REST) application programming interface; and
program instructions to create, by the robotic process automation robot, a user profile and the password by navigating a database user interface.

13. The computer system of claim 11, further comprising:
program instructions to execute, by the robotic process automation robot, a password generator plugin.

14. The computer system of claim 11, further comprising:
program instructions to utilize one or more plugins to format the generated password or retrieved and decrypted password into a required format for executing the deployment process.

15. A computer program product comprising:
one or more computer readable storage devices and program instructions stored on the one or more computer readable storage devices, the stored program instructions comprising:
program instructions to run, through a continuous integration server, a deployment process;
responsive to encountering an access-controlled resource that requires a password, executing a password manager component;
program instructions to utilize the password manager component to determine if the password is stored in an encrypted format on a database;
responsive to determining the password is stored in the encrypted format on the database, program instructions to decrypt the password based on a master key, wherein the master key is managed through a generation algorithm; and
responsive to decrypting the password, program instructions to integrate the password into a configuration file located in source code of an application, wherein the password is not accessible outside the password manager component.

16. The computer program product of claim 15, further comprising:
program instructions to download, by the continuous integration server, the configuration file on a build server.

17. The computer program product of claim 15, further comprising:
program instructions to receive a password job; and
program instructions to activate a robotic process automation robot.

18. The computer program product of claim 17, further comprising:
responsive to determining that the password is not present in the database, program instructions to execute a workflow to generate a new password by navigating said access-controlled resource, wherein generating the new password comprises:
program instructions to load and execute, by the robotic process automation robot, the workflow to generate the new password by representational state transfer (REST) application programming interface; and
program instructions to create, by the robotic process automation robot, a user profile and the password by navigating a database user interface.

19. The computer program product of claim 18, further comprising:
program instructions to execute, by the robotic process automation robot, a password generator plugin.

20. The computer program product of claim 18, further comprising:
program instructions to utilize one or more plugins to format the generated password or retrieved and decrypted password into a required format for executing the deployment process.

\* \* \* \* \*